E. HIXON.
AUTOMATIC SHUT-OFF.
APPLICATION FILED JAN. 31, 1912.
1,058,238.
Patented Apr. 8, 1913.
4 SHEETS—SHEET 1.
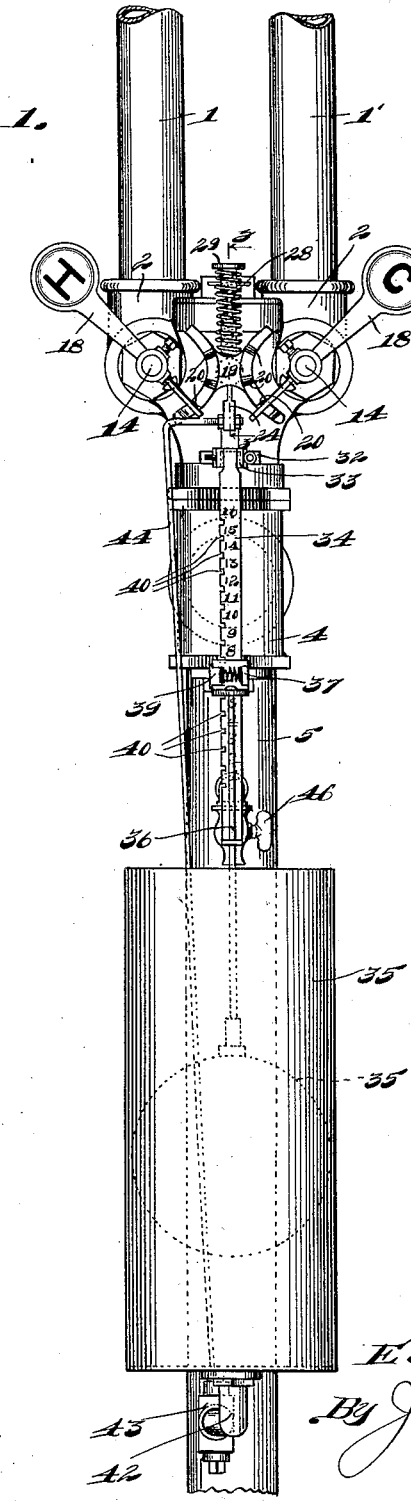

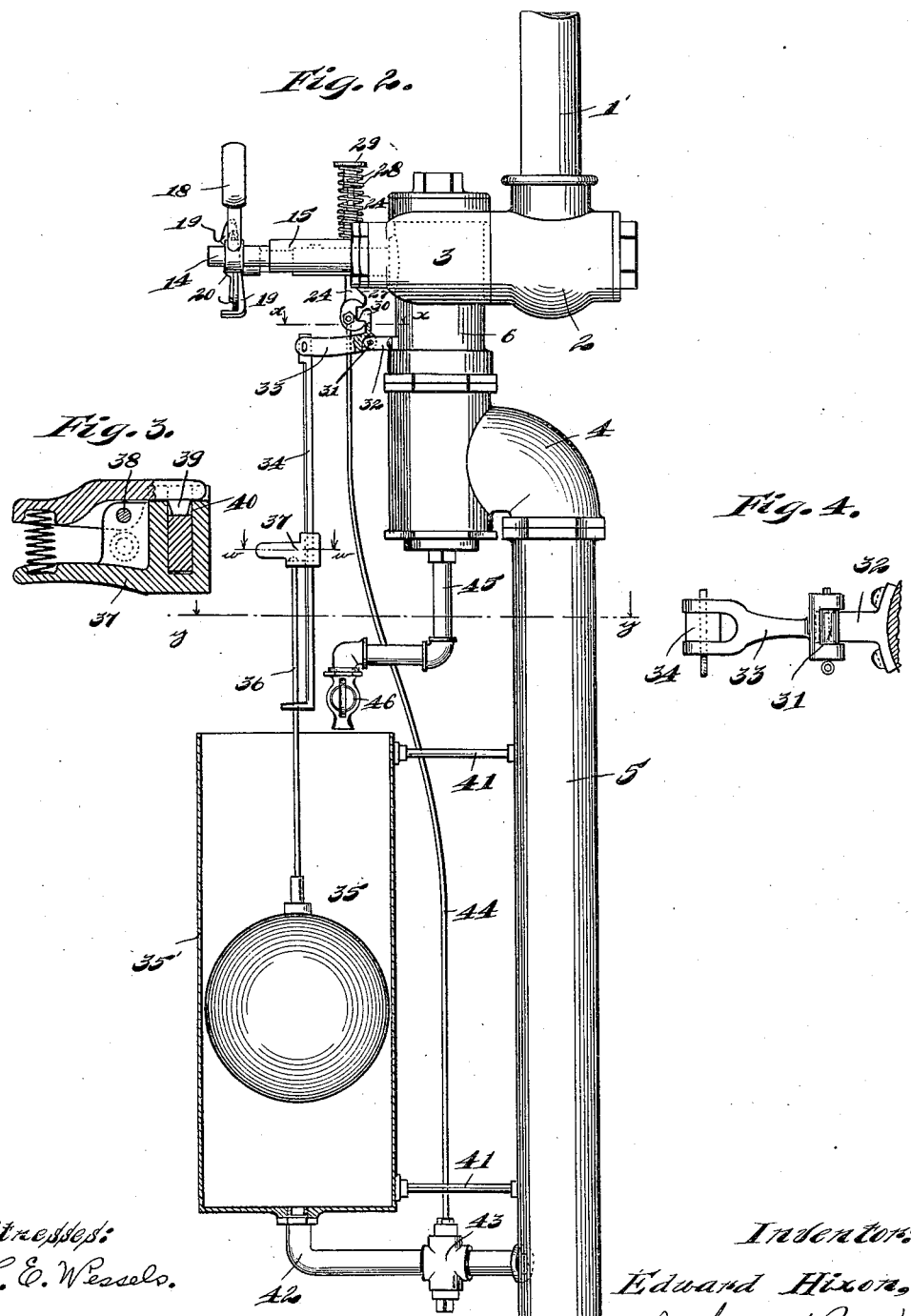

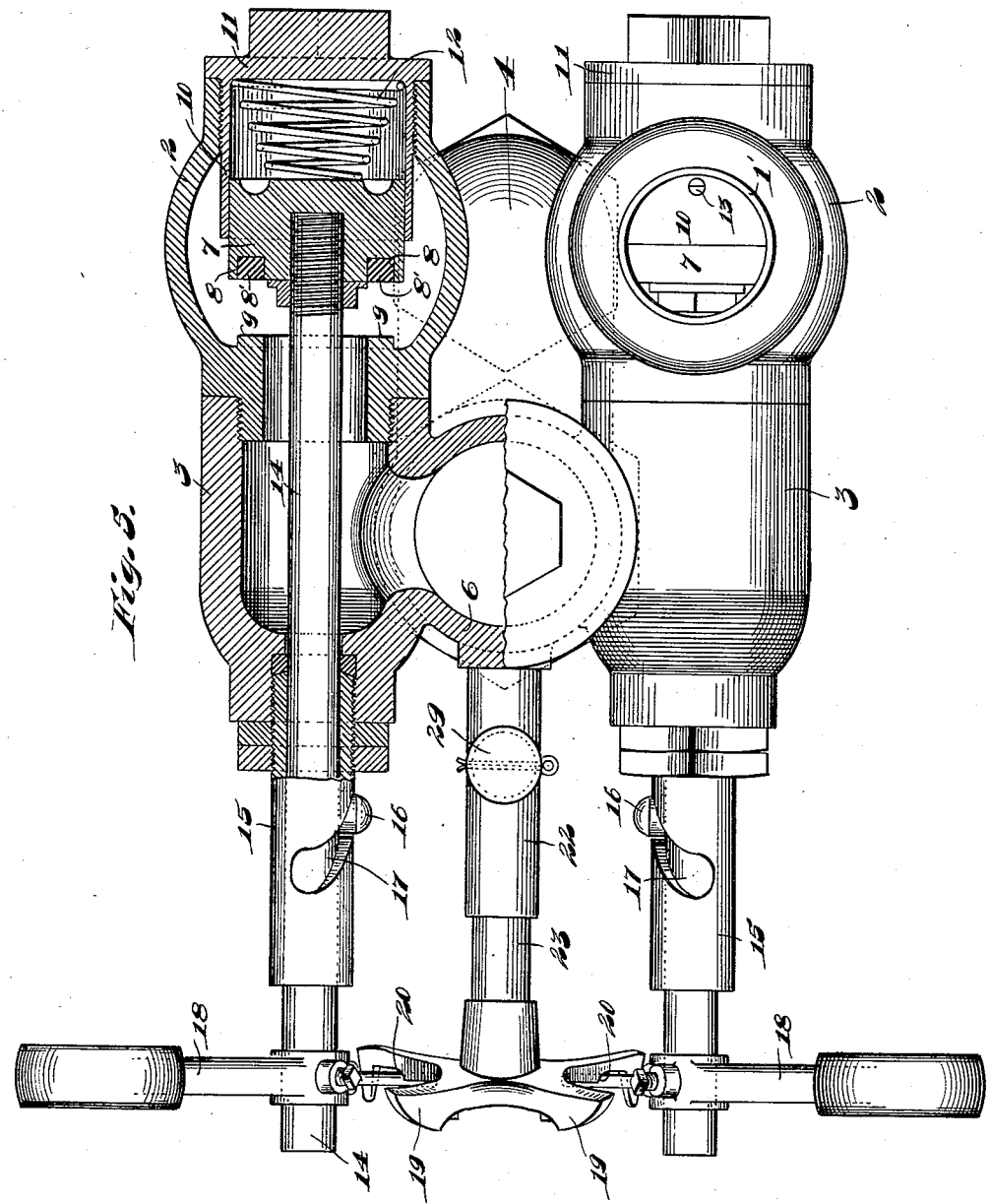

E. HIXON.
AUTOMATIC SHUT-OFF.
APPLICATION FILED JAN. 31, 1912.
1,058,238.
Patented Apr. 8, 1913.
4 SHEETS—SHEET 4.
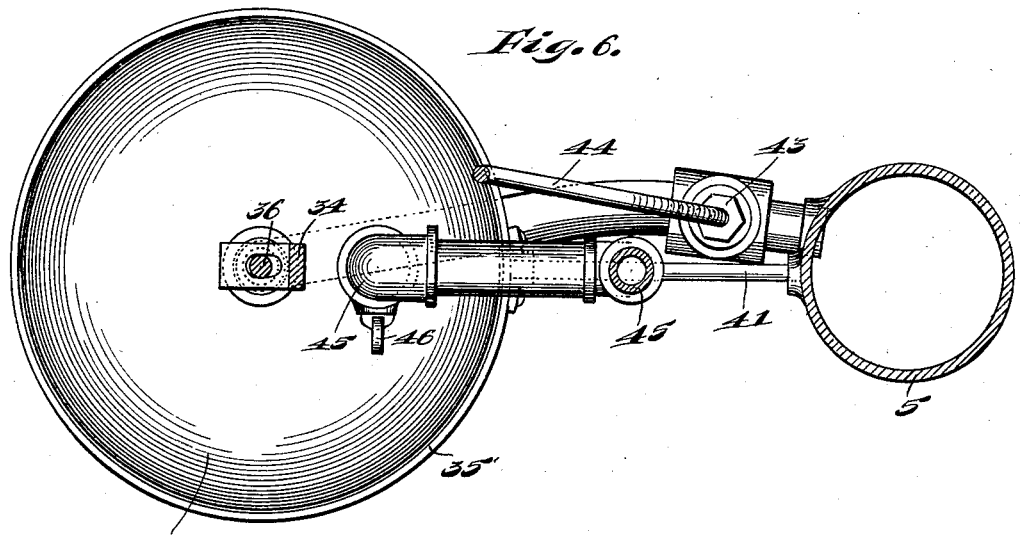
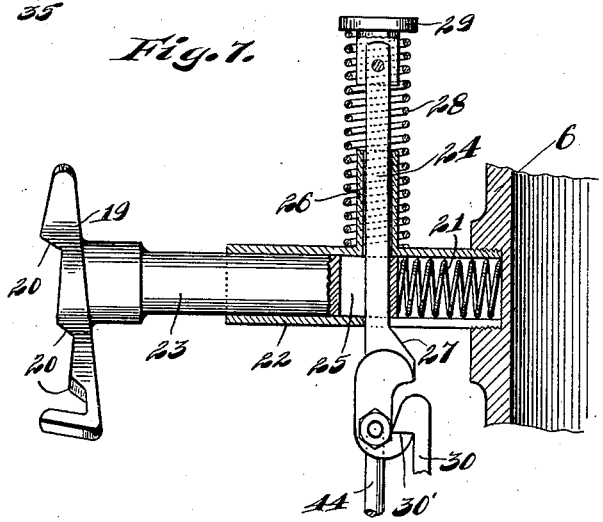

UNITED STATES PATENT OFFICE.

EDWARD HIXON, OF CHICAGO, ILLINOIS, ASSIGNOR TO HIXON AUTOMATIC VALVE COMPANY, OF CHICAGO, ILLINOIS, A CORPORATION OF ILLINOIS.

AUTOMATIC SHUT-OFF.

1,058,238. Specification of Letters Patent. Patented Apr. 8, 1913.

Application filed January 31, 1912. Serial No. 674,855.

*To all whom it may concern:*

Be it known that I, EDWARD HIXON, a citizen of the United States, and a resident of the city of Chicago, county of Cook, and State of Illinois, have invented certain new and useful Improvements in Automatic Shut-Offs, of which the following is a specification.

My invention relates to improvements in automatic fluid shut-offs, and more specifically to a device of this character which is designed for use where it is desired to fill a tank to a certain degree or depth and then to stop automatically the flow of the fluid thereinto.

The object of my invention is the production of an automatic shut-off of the character mentioned which will be of improved construction and efficient in operation.

Other objects will appear hereinafter.

With these objects in view, my invention consists in the combinations and arrangements of parts hereinafter described and claimed.

My invention will be best understood by reference to the accompanying drawings forming a part of this specification, and in which—

Figure 1 is a front elevation of an automatic shut-off embodying my invention, Fig. 2 is a side elevation thereof, portions being broken away and shown in section in order to better illustrate the construction, Fig. 3 is an enlarged detail section taken on substantially line *w w* of Fig. 2, Fig. 4 is an enlarged sectional detail taken on substantially line *x x* of Fig. 2, Fig. 5 is an enlarged top plan view of the device, one side thereof being shown in section, Fig. 6 is an enlarged section taken on substantially line *y y* of Fig. 2, and Fig. 7 is an enlarged detail section taken on substantially line *z z* of Fig. 1.

The preferred form of construction, as illustrated in the drawings, comprises hot and cold water supply pipes 1 and 1' respectively, the upper ends of said pipes communicating with any suitable source of hot and cold water supply. The lower ends of the pipes 1 and 1' are connected through the medium of the valve casings 2, and the couplings 3 and 4 with a common discharge pipe 5 which communicates with the desired tank, vat, or other receptacle into which it is desired to deliver the water. The coupling 3 communicates, as shown in Fig. 5, with the valve casings 2, the passages in the opposite sides of said coupling leading to a common central passage 6 which communicates with the coupling 4, and so that during operation of the device, the hot and cold water after reaching the coupling 3 will be merged and will flow together from said coupling through the coupling 4 to the pipe 5.

The flow of water from the pipes 1 and 1' to the opposite sides of the coupling 3 is controlled by valves 7 which are mounted in the valve casings 2, the valves 7 being of similar construction so that the description of one will be sufficient. Each valve 7, as shown in Fig. 5, is formed in one side with an annular groove 8 in which is mounted a rubber ring 8' which is adapted to seat against the annular shoulder or valve seat 9 to stop the flow of the liquid to the coupling 3. The rearward end of the valve 7 is slidably mounted in a tubular guide 10 which is formed integral with the head 11 of the valve casing, a compression spring 12 being interposed between said head and said valve to serve to normally hold the latter in closing position, that is with the ring 8' abutting the valve seat 9. Provided in one side of the guide 10 is a perforation 13 which affords an avenue of escape for the fluid imprisoned behind the valve when the latter is reciprocated.

The valves 7 are carried by stems 14 which are reciprocally and rotatably mounted in guide sleeves 15 secured to and projecting from the opposite sides of the coupling 3. Projecting from the stems 14 are pins 16 which engage inclined cam slots 17 formed in the sleeves 15 so that oscillatory movement of said stems will simultaneously effect longitudinal or reciprocatory movement thereof and hence of the valves connected therewith. Adjustably secured to the outer extremities of the stems 14 are weight-arms 18, the arrangement being such that, when the outer weighted ends of said arms are released from an elevated position, the rocking thereof by gravity will cause the rotation of said stems 14 to effect the seating or closing of the valves 7.

The arms 18 are held with their outer weighted ends in elevated positions by means of a toothed head 19 which is movably mounted intermediate the stems 14.

The teeth 20 provided in the opposite sides of the head 19 are adapted to engage with the inner ends of the arms 18 in serving to hold said arms with the weighted ends thereof in elevated positions. A plurality of teeth 20 is provided for engagement by the inner end of each of the arms 18 so that said arms may be held in various inclined positions, and hence the valves coöperating therewith correspondingly in positions of various degrees of openness. With this arrangement the temperature of the water supplied to the pipe 5 may be controlled by the positions of the arms 18, since the proportion of hot and cold water supplied to said pipe may be varied by simply adjusting said arms at different angles.

The arrangement is such, as will be observed, that the operation of the valves is controlled by the member 19, it being clear that by retracting said member 19 in order to release the arms 18, the latter will swing by gravity to close the valves.

The mechanism for retracting the member 19 at a predetermined time or at a time when the tank or receptacle which is supplied by the pipe 5 is filled to the desired extent, will be described in the following: This mechanism includes the employment of a helical compression spring 21 which is mounted in the tubular guide 22 for the slidably mounted stem 23 of the member 19, as shown in Fig. 7, said spring serving to normally hold the member 19 at its outer terminal of movement. The amplitude of reciprocation permitted the stem 23 and hence the member 19, is governed by a vertically extending member 24 which passes through a diametric slot 25 provided in the stem 23, said member passing diametrically through the slot 25 and being slidably mounted in a tubular guide 26 which is formed upon the member 22. Formed at the lower end of the member 24 is an inclined cam surface 27 adapted, when the member 24 is moved upwardly, to engage one extremity of the slot 25 to move the stem 23 and hence to retract the member 19. The member 24 is normally held at its upper terminal of movement or in a position to effect the retraction of the member 19, by means of a helical compression spring 28 which is interposed between the member 22 and a head 29 provided at the upper end of said member 24.

The member 24 is held at its lower terminal of movement or in a position for operation, by means of a detent or pawl 30 which engages a notch 30' provided at the lower end of said member 24. The member 30 is pivotally mounted at 31 upon the outer end of a stationary supporting arm 32. Formed integral with and projecting from the lower end of the detent 30 is an arm 33 adapted, when oscillated upwardly, to effect the tripping of said detent. The outer end of the arm 33 is pivotally connected with the upper extremity of the upper section 34 of the stem of a float 35 which is mounted for vertical movement in the float tank or receptacle 35'. The lower section 36 of the float stem is adjustably connected with the section 34 through the medium of a member 37 which is connected with the upper end of said section 36, said member 37 slidably embracing the section 34. Pivoted at 38, as shown in Fig. 3, upon the member 37 is a spring pressed pawl 39 adapted to engage teeth 40 provided at one edge of the section 34 so that longitudinal adjustment of the float stem and hence of the vertical position of the float relative to the tank or receptacle 35' may be effected by simply manipulating the pawl 39 and the carrier 37 thereof, said pawl, when released and engaged with one of the teeth 40, serving to lock the float stem sections in their positions of adjustment. The front side of the stem section 34 is graduated, as shown, for coöperation with the member 37 and pawl 39, in adjusting the length of the float stem and hence of the vertical position of the float relative to the float receptacle.

The arrangement is such, as will be observed, that vertical movement of the float will serve to tilt or trip the detent 30 and thus to effect the release of the valve operating arms 18, and so that in the operation of the device when water supplied to the float receptacle 35' has reached a level in said receptacle such as to effect the raising of the float, the water supplied to the pipe 5 from the pipes 1 and 1' will be automatically shut off.

The receptacle 35' is supported by means of supporting arms 41, a drain pipe 42 leading from the lower end thereof which discharges into the pipe 5. The passage through the drain pipe 42 is governed by a suitable valve 43 which is controlled by the stem 44. The stem 44 is connected with the lower end of the member 24, as shown in Fig. 2, the arrangement being such that, when the member 24 is released to effect the release of the arms 18 and hence the closing of the valves 7, the valve 43 will be opened so as to permit of the drainage of the water from the receptacle 35', lowering of the member 24 to position for operation effecting the closing of said valve 43.

Water is supplied to the receptacle 35' through a pipe 45 which leads from the lower end of the coupling 4, there being a suitable stop cock 46 provided at the lower end of the pipe 45. Said pipe 45 is of a diameter considerably less than that of the main water passage through the device, the proportion of the liquid which will flow through the pipe 45 to that which flows to the pipe 5 during the operation of the device, being known; the graduations upon the float stem sections 34 being positioned accordingly, so that with the float in a certain vertical position, a known quantity of water, as indicated by the graduations, will be supplied through the pipe 5 to the tank or other receptacle which is being filled before the level in the receptacle 35' will reach a point to effect the raising of the float 35. With this construction then, after the float has been properly adjusted to permit of the flow of a certain quantity of water to the receptacle in conjunction with which the device is used, as indicated by the graduations upon the float stem, the valve operating arms 18 will be raised to open the valves. When the desired quantity of water has been supplied to the tank or other receptacle used in conjunction with the device, the level of the water in the receptacle 35' will be such as to result in the elevation of the float which will effect the automatic closing of the valves, as above described.

A device of the construction set forth is durable and economical and the same will be found to be of high efficiency in operation.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

1. A device of the character described, comprising a fluid supply pipe; a reciprocatory valve interposed in said supply pipe; a stationary sleeve through which the stem of said valve projects; an inclined cam slot in said sleeve; a pin projecting from said stem engaging said slot whereby oscillation of said stem effects reciprocation thereof; a weight-arm connected with said stem adapted when released from a position with its free end elevated to oscillate said stem to move said valve to closed position; a movable member adapted to releasably engage said weight-arm to hold the free end thereof in elevated position; a spring operated member adapted to move said last mentioned member to release said weight-arm; a detent for releasably holding said spring operated member in position for operation; and a float for tripping said detent, substantially as described.

2. A device of the character described, comprising a fluid supply pipe; a reciprocatory valve interposed in said supply pipe; a stationary sleeve through which the stem of said valve projects; an inclined cam slot in said sleeve; a pin projecting from said stem engaging said slot whereby oscillation of said stem effects reciprocation thereof; a weight-arm connected with said stem adapted when released from a position with its free end elevated to oscillate said stem to move said valve to closed position; means for releasably holding said weight-arm with its free end elevated; a float for operating said last mentioned means to release said weight-arm; a receptacle in which said float operates; and a restricted supply for said receptacle leading from said main supply pipe below said valve, substantially as described.

3. A device of the character described, comprising a fluid supply pipe; a reciprocatory valve interposed in said supply pipe; a stationary sleeve through which the stem of said valve projects; an inclined cam slot in said sleeve; a pin projecting from said stem engaging said slot whereby oscillation of said stem effects reciprocation thereof; a weight-arm connected with said stem adapted when released from a position with its free end elevated to oscillate said stem to move said valve to closed position; a movable member adapted to releasably engage said weight-arm to hold the free end thereof in elevated position; means adapted when released from position for operation to automatically operate to retract said last mentioned member to release said weight-arm; and float operated means for releasably holding said last mentioned retracted means in position for operation, substantially as described.

4. A device of the character described, comprising a fluid supply pipe; a normally closed valve interposed in said supply pipe; means for releasably holding said valve open; a float for operating said last mentioned means to release said valve; a receptacle in which said float operates; a supply pipe for said receptacle communicating with said fluid supply pipe below said valve; a drain pipe for said receptacle; a valve controlling said drain pipe; and means for operating said drain pipe valve whereby the passage through said drain pipe will be opened simultaneously with the closing of said valve, substantially as described.

5. The combination with a pair of valves; weighted levers for operating said valves to their normal positions; a reciprocating stem arranged adjacent to said valves; means carried by said stem for engagement with the levers aforesaid for retaining said valves in their abnormal positions; a float; and a connection between said float and said reciprocating member whereby said valves may be released for assuming their normal positions, substantially as described.

6. The combination with a pair of valves;

weighted levers for operating said valves to their normal positions; a reciprocating stem arranged adjacent to said valves; means carried by said stem for engagement with the levers aforesaid for retaining said valves in their abnormal positions; a tank arranged adjacent to said valves; a float mounted in said tank; a rod carried by said float; a bell crank adapted to be oscillated by means of said rod; and an operating member adapted to be tripped by the movement of said bell crank for reciprocating said stem, substantially as described.

In testimony whereof I have signed my name to this specification in the presence of two subscribing witnesses.

EDWARD HIXON.

Witnesses:
ARTHUR A. OLSON,
JOSHUA R. H. POTTS.

Copies of this patent may be obtained for five cents each, by addressing the "Commissioner of Patents, Washington, D. C."